United States Patent [19]

Maxfield et al.

[11] Patent Number: 4,472,489

[45] Date of Patent: Sep. 18, 1984

[54] POLYMERIC ELECTRODE COATED WITH REACTION PRODUCT OR ORGANOSULFUR COMPOUND

[75] Inventors: MacRae Maxfield, North Plainfield; Lawrence W. Shacklette, Maplewood; James F. Wolf, Mine Hill; Suzanne M. Savner, Lake Hiawatha, all of N.J.

[73] Assignee: Allied Corporation, Morris Township, Morris County, N.J.

[21] Appl. No.: 556,739

[22] Filed: Nov. 30, 1983

[51] Int. Cl.$^3$ .............................................. H01M 4/60
[52] U.S. Cl. .................................... 429/213; 429/122; 252/182.1
[58] Field of Search .............................. 429/213, 122; 525/328.1, 275; 252/182.1

[56] References Cited

U.S. PATENT DOCUMENTS

| | | | |
|---|---|---|---|
| 4,321,114 | 3/1982 | MacDiarmid et al. | 204/2.1 |
| 4,343,871 | 8/1982 | Tobishima et al. | 429/213 |
| 4,394,304 | 7/1983 | Wnek | 525/275 |
| 4,401,545 | 8/1983 | Naarman et al. | 429/213 |
| 4,442,187 | 4/1984 | MacDiarmid et al. | 429/213 |

FOREIGN PATENT DOCUMENTS

| | | | |
|---|---|---|---|
| 0050441 | 4/1982 | European Pat. Off. | 429/213 |
| 1216549 | 12/1970 | United Kingdom | 429/213 |

OTHER PUBLICATIONS

Kaneto et al., Japanese Journal of Applied Physics, vol. 22, No. 9, Sep. 1983, pp. L567–L568.
Kaneto et al., Japanese Journal of Applied Physics, vol. 22, No. 7, Jul. 1983, pp. L412–L414.

*Primary Examiner*—Brian E. Hearn
*Assistant Examiner*—Gerard P. Rooney, Jr.
*Attorney, Agent, or Firm*—Alan M. Doernberg; Gerhard H. Fuchs

[57] ABSTRACT

Conjugated backbone polymer electrodes such as polyacetylene anodes are coated with the reaction product of the reduced polymer with a sultone or sulfonate. Such coating may have occurred by using a sultone such as propane sultone in the electrolyte of a battery with such an anode, or in electrode preparation. The coating improves the stability of the electrode, especially when the polymer is highly reduced during battery use, whether the sultone remains as all or part of the electrolyte, or the sultone is replaced by a solvent such as propylene carbonate in the electrolyte for the battery containing coated electrode.

17 Claims, No Drawings

POLYMERIC ELECTRODE COATED WITH REACTION PRODUCT OR ORGANOSULFUR COMPOUND

DESCRIPTION

The present invention relates to polymeric electrodes, and especially such electrodes having conjugated backbone polymers as the electroactive material coated with the product of reaction between reduced conjugated backbone polymers and a sultone or sulfonate.

Conjugated backbone polymers, e.g., polyacetylene, polyphenylene, polyacenes, polythiophene, poly(phenylene vinylene), polyazulene, poly(phenylene sulfide), poly(phenylene oxide), polythianthrene, poly(phenylquinoline), polyaniline, and polypyrrole, have been suggested for use in a variety of applications based upon their characteristic of becoming conductive when oxidized or reduced either chemically or electrochemically. The secondary battery application described, by e.g., MacDiarmid et al. in U.S. Pat. No. 4,321,114 (1981), employs one or more electrodes having conjugated backbone polymers as electroactive material. Such electrodes can, for example, be reversibly complexed with alkali metal or tetraalkylammonium cations during battery cycling, most commonly with insertion of cations into a polymer anode (the negative battery electrode) occuring during charging. The more such cations are inserted, the more conductive the electrode becomes and the more cathodic the potential of the anode becomes.

While higher energy and power densities for such batteries would generally be achieved by greater reduction levels of such polymer anodes, there are usually self-discharge and/or solvent- or salt-degradation reactions which occur between such a highly reduced polymer anode and typical electrolytes. Several modifications of the electrolyte have been proposed to minimize these reactions and permit high charging levels. It is desirable, however, to be relatively free of such constraints on choice of solvent and dissolved salt so that other beneficial properties such as salt solubility, electrolyte conductivity, solution viscosity, and stability to the charged cathode can be maximized. Of course, modifications in the polymer electrode which are advantageous for such battery anode use could also be useful in other applications of highly reduced (donor-doped) polymer electrodes where lowering the surface reactivity of the polymer is important, as would be the case if said donor-doped polymer were to be exposed to the atmosphere, even if only briefly during fabrication of a battery or other electrochemical system.

BRIEF DESCRIPTION OF INVENTION

It has been discovered that surface coatings of the product of reaction between reduced conjugated backbone polymer and an organic compound which is a sultone or sulfonate imparts stability to polymeric electrodes, even when heavily donor-doped, against self-discharge or electrolyte-degradation reactions. Accordingly, the present invention includes a polymeric electrode comprising a conjugated backbone polymer as electroactive material and a surface coating which is the product of reaction between a reduced conjugated backbone polymer and an organic compound selected from the group consisting of sultones of the formula

wherein R is alkylene of 2–12 carbons or alkoxy-substituted alkylene of 2–12 carbons or fused polycyclic of 9–20 carbons and other ring atoms, forming with sulfur and oxygen a heterocyclic ring of 4–7 atoms and sulfonates of the formula

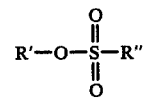

wherein R" is alkyl of 1–12 carbons, aryl or alkyl-substituted aryl of 7–20 carbons; and R' is unsubstituted alkyl of 1–12 carbons or is such alkyl substituted by alkoxy, aryl, alkyl-substituted aryl, aromatic heterocycle, non-aromatic unsaturated heterocycle or saturated heterocycle, or is $H((CH_2)_p-O)_q-(CH_2)_m$ where m is an integer of 1–3, p is an integer of 1–3 and q is an integer of 1–20, or is

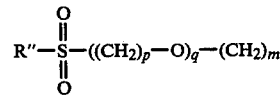

with R" m, p and q defined as above.

The present invention also includes a battery comprising at least two electrodes, at least one of which is the electrode described in the preceding paragraph. Preferably, such battery electrode is an anode into which alkali metal or tetraalkylammonium cations are inserted during the charging of said battery. The battery may contain the same or different organosulfur compound as solvent, as described in copending, commonly assigned application U.S. Ser. No. 556,717 of James F. Wolf et al., "Conjugated Polymer Battery Containing Organosulfur Solvent", filed herewith, or may contain other solvents.

DETAILED DESCRIPTION OF THE INVENTION

The first form of the present invention is a surface-coated polymeric electrode. The polymer which forms the electroactive material of the electrode may be any of a variety of conjugated backbone polymers. The polymers disclosed specifically in U.S. Pat. No. 4,321,114 may be used: polyacetylene (PA), polyphenylene (PPP if in para form), poly(phenylene sulfide), poly(phenylene vinylene) and polypyrrole. Other conjugated backbone polymers, claimed by others to be useful in batteries, may also be used in the present invention: polythiophene, polyazulene, poly(phenylquinoline), polyacenes, poly(phenylene oxide) and polynaphthalene. As a general matter, conjugated backbone polymers stable to donor-doping by alkali metal cations or tetraalkylammonium cations are highly preferred, with all the above listed polymers qualifing on this basis except, perhaps, poly(phenylene sulfide), poly(phenylene oxide) and polypyrrole. Polyacetylene and poly(p-phenylene) are the most preferred polymers for the present electrodes.

The electrodes need not be limited to the conjugated backbone polymer, but rather may contain other constituents such as metallic or graphite conductivity aids and current collectors, inert binders or mechanical supports and non-polymeric electroactive materials. In many electrodes, however, the conjugated backbone polymer is a major proportion, or even essentially all of the bulk material and of the surface which is coated by the reaction product of the organosulfur compound.

The organosulfur surface coating of the present polymeric electrodes is difficult to characterize by its own structure, and therefore can best be understood as the product of reaction between a donor-doped (reduced) conjugated backbone polymer and an organosulfur compound which is a sultone or sulfonate. It is possible, but not necessary, to have the conjugated backbone polymer chemically donor-doped prior to such reaction with, for example, organometallic compounds such as butyllithium, ethylsodium or the like (as described in copending commonly-assigned application U.S. Ser. No. 556,718 of Ronald L. Elsenbaumer et al., filed herewith) being suitable. In many embodiments, however, the donor-doped polymer for such reaction is achieved by electrochemically reducing the polymer of the polymeric electrode in the presence of the organosulfur compound as a portion or all of the solvent for the electrochemical reduction. This electrochemical coating process may also occur during the normal operation of a battery containing a polymer electrode if the organsulfur compound is a component of the electrolyte of such battery.

Suitable organic compounds for such reaction to produce a surface coating include the sultones and sulfonates described as battery solvents in copending application U.S. Ser. No. 556,717, as well as higher molecular weight analogs which are themselves perhaps not suitable as battery solvents, but which may be used for surface coating. Sultones suitable for such use are those of the formula

wherein R is alkylene of 2-12 carbons or alkoxy-substituted alkylene of 2-12 carbons or fused polycyclic of 9-20 carbons and other ring atoms, forming with sulfur and oxygen a hetercyclic ring of 4-7 atoms. Exemplary such sultones are those wherein R is $(CH_2)_n$ with n being an integer of 2-5 carbons: ethane sultone (n=2), propane sultone (n=3), butane sultone (n=4) and pentane sultone (n=5). Also suitable are alkyl-substituted sultones where R is branched alkyl such as in 3-methylpropane sultone, 2,3-dimethyl butane sultone and 3-hexyl-propane sultone. Also suitable are alkoxy-substituted sultones where R is alkoxy-substituted alkylene such as 3-methoxy-propane sultone or 2-methyl-3-methoxy-butane sultone. Other substituents may also be present on or fused with the heterocycle such as aryl and alkyl-substituted aryl.

Examples of such groups on the heterocyclic ring include 2-phenylpropane sultone and 2-p-tolylbutane sultone. Examples of fused polyclics include 1,2 benzopropane sultone:

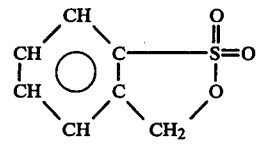

the 5-methyl-substituted analog thereof, and the saturated counterparts thereof. The criterion of 9-20 carbons and other ring atoms applies to the above structure as 9: seven carbons and two other ring atoms (S and O). The above structure could, therefore, be substituted with one or more alkyls of up to 11 total carbons (for any of the H's).

Propane sultone (1,2-oxathiolane 2,2-dioxide) and butane sultone (1,2-oxathiane 2,2-dioxide) are especially preferred.

Suitable sulfonates useful as an organic compound for the reaction to produce surface coating are those of the formula

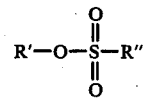

wherein R'' is alkyl of 1-12 carbons, aryl or alkyl-substituted aryl of 7-20 carbons. Such R'' includes methyl, ethyl, butyl, decyl, phenyl and p-tolyl. R' can be alkyl of 1-12 carbons such as methyl, ethyl, butyl, hexyl, decyl and dodecyl. R' can also be alkyl substituted by alkoxy, aryl, alkyl-substituted aryl, aromatic heterocycle, non-aromatic unsaturated heterocycle or saturated heterocycle such as

where t is an integer of 1-12 and Q is methoxy, ethoxy, propoxy, phenyl, naphthyl, p-tolyl, pyridinyl, furyl, tetrahydrofuryl or pyrrolyl. Q may also be substituted on a non-terminated carbon of the alkyl. R' also can be

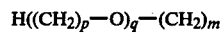

or

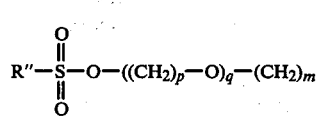

where m is an integer of 1-3, p is an integer of 1-3 and q is an integer (or series of integers different for different members of a mixture of sulfonates) of 1-20. The integers m and p are preferably the same (such as in poly(ethylene oxide) or poly(propylene oxide) groups). For propylene oxide residues, the term $-(CH_2)_3-O-$ should be understood to actually be $-CH(CH_3)-CH_2-O-$.

Exemplary such R' and R'' substituents include those wherein R' and R'' are each, independently, $CH_3-(CH_2)_m-$, with m being an integer of 0-5, but preferably not 0 for R'. Exemplary compounds include ethyl methanesulfonate (R'=ethyl; R''=methyl), butyl ethanesulfonate (R'=butyl, R''=ethyl) and pentyl propanesulfonate (R'=pentyl, R''=propyl).

Again these sulfonates include materials indicated in copending application U.S. Ser. No. 556,717 as suitable for battery electrolyte solvents, but also include higher molecular weight analogs.

The method of surface-coating may consist merely of leaving the charged electrode in contact with a solvent containing or consisting of the organic compound for a controlled period. It is generally desirable, in order to achieve adequate surface-coating, that the polymer be doped to an extent of at least that sufficient to reduce its electrochemical potential to 1.0 V (versus a reversible lithium reference) or less, although lesser reduction levels (higher potentials) may be adequate provided that the reaction is given a longer period of time to occur. Such coating may take the form of an initial charging of the battery of copending application U.S. Ser. No. 556,717, or may take the form of such charging followed by discharge, removal of the sultone or sulfonate-containing electrolyte and substitution of a different solvent such as an ether. It is also not required that the coating occur in a battery configuration, since, for example, a series of electrodes can be chemically doped in the manner of application U.S. Ser. No. 556,718 or electrochemically doped, and then placed in a bath containing the organosulfur compound. Similarly, a series of electrodes can be each connected electrically to a source of alkali metal (e.g., a lithium electrode) in a bath containing organosulfur compound in which is dissolved a lithium salt.

Furthermore, once the surface coating is formed, it is not necessary that the electrode remain reduced; and it may, in fact, be subsequently freed of inserted alkali metal or tetraalkylammonium cations by battery cycling. In such event, the coated electrode can be assembled at a later time into the battery of the present invention. It is preferred, however, to leave the surface-coated polymer electrode with at least a minimal amount of incorporated alkali metal or tetraalkylammonium cations so that the high resistance of the undoped polymer need not be overcome on subsequent doping or redoping. It is also generally preferred that the reaction occur in the housing of the ultimate battery or immediately before placing the electrode in such housing.

Once the surface-coated polymeric electrode is formed, it may be used in a variety of batteries. Three common uses of the polymeric electrode are as an anode versus an acceptor-doped (oxidized) polymeric cathode (which is inserted with anions during charging), as an anode versus an inorganic ion-insertion cathode such as a transition metal chalcogenide (which is intercalated by alkali metal cations during discharging), and as a cathode (inserted with alkali metal cations during discharging) versus an alkali metal anode (which is plated by alkali metal such as lithium during charging). Several illustrative battery configurations are tabulated in Table I below. It should be noted that, in those instances where the electrolyte does not contain a sultone or sulfonate, then the surface-coated polymeric electrode would have been coated in the manner described above in contact with a different solvent or electrolyte which did contain such sultone or sulfonate.

Among the above configurations, it is generally preferred that the coated polymeric battery electrode be an anode inserted with alkali metal or tetraalkylammonium cations during the charging of the battery. It is also preferred that the organic compound used for such coating be a sultone, and especially one of the above formula wherein R is $(CH_2)_n$ with n being an integer of 3-5. It is preferred in all instances that the conjugated backbone polymer be polyacetylene (PA). Furthermore, it is preferred that such anode be inserted either with lithium cations during charging or with sodium cations during charging, with potassium cations being next most peferred.

TABLE I

| Configuration | Anode | Cathode | Electrolyte |
|---|---|---|---|
| 1 | PS-coated PA* | PA | $LiPF_6$/PS |
| 2 | PS-coated PA* | $TiS_2$ | $LiBF_4$/PS |
| 3 | PS-coated PA** | $TiS_2$ | $LiClO_4$/THF |
| 4 | PS-coated PA* | $TiS_2$ | $LiClO_4$/THF+ PS 80:20) |
| 5 | PS-coated PA* | $Li_xCoO_2$ | $LiPF_6$/(SL + PS) (90:10) |
| 6 | PS-coated PA* | $V_6O_{13}$ | $LiBF_4$/(THF + PS) (90:10) |
| 7 | BS-coated PA* | PA | $LiPF_6$/(SL + BS) (90:10) |
| 8 | BS-coated PA** | PA | $LiPF_6$/PC) |
| 9 | PS-coated PA* | PT | $LiPF_6$/(PC + PS) (90:10) |
| 10 | PS-coated PA* | PPy | $LiBF_4$/(THF + PS) (80:20) |
| 11 | PS-coated PPP* | $TiS_2$ | $LiPF_6$/(THF + PS) (90:10) |
| 12 | Li | PS-coated PA* | $LiClO_4$/ (THF + PS)(70:30) |
| 13 | coated PA*** | $Li_xCoO_2$ | $(LiPF_6 + KPF_6)$/ (AN + PS) (70:30) |

*coated during first cycle
**previously coated with a different electrolyte rich in PS or BS
***coated by leaving group (polypropoxy) from sulfonate
PS = propane sultone
BS = butane sultone
PC = propylene carbonate
THF = tetrahydrofuran
SL = sulfolane
AN = acetonitrile
PA = polyacetylene
PPP = poly(p-phenylene)
PPy = polypyrrole
PT = polythiophene

EXAMPLES

EXAMPLE 1

A battery was constructed in a sealed glass container and consisting of a lithium anode with expanded nickel current collector, polyacetylene (PA) film cathode synthesized by the technique of Shirakawa with a platinum current collector and an electrolyte comprised of 1.0M $LiClO_4$ in 1,4-butane sultone. This battery was cycled four times between 2.5 and 0.7 V such that polyacetylene became reduced (n-doped) during discharging. The doping level was 3-4%. The coulombic efficiency increased with cycling and was 93% on the fourth cycle. This battery was then cycled three more times between 2.5 and 0.7 V and then cycled three times between 2.5 and 0.2 V with the final cycle between these two limits giving a coulombic efficiency of 99%. This battery was then cycled twice between 1.0 V and 0.2 V with a coulombic efficiency of 93% and a doping level of 8.5% between these voltage limits. The battery was subsequently cycled five times between 1.0 and 0 V vs. $Li^+$/Li with the efficiency of the last cycle being 96%. The battery was then completely recharged at 2.5 V. The charge out corresponded to an equivalent doping level of 40% per CH unit.

The battery was subsequently discharged to an equivalent 30% doping level, stored for thirteen days and completely charged. The charge obtained corresponded to a 90% coulombic efficiency.

EXAMPLE 2

A battery was constructed as outlined in Example 1. After the first cycle between 0.6 and 2.5 V this battery was cycled between 0.5 and 1.5 V. Every three cycles the lower potential was stepped down 100 mV. The potential limits of the final cycle was 0.3 and 1.5 V. The average efficiency, 9 cycles, was 94% with the average reduction level of the PA being 8%.

EXAMPLE 3

A battery was constructed as outlined in Example 1 (including a LiClO$_4$ in butane sultone electrolyte) except that both the anode and cathode were polyacetylene with a lithium reference. The anode and cathode were charged and discharged independently vs. the lithium reference and then cycled as an all polymer battery between 0.7 and 2.5 volts. The doping levels were 4%. The coulombic efficiency improved with cycling and was 86% on the fifth cycle. The battery was then cycled three times between 3.5 and 1.0 V with an average coulombic efficiency of 90%. The cathode was then discharged and the anode was charged vs. the lithium reference to a 5% doping level. The all polymer cell was then cycled between 3.7 and 1.5 V seven times. The average coulombic efficiency was 88%.

EXAMPLE 4

A battery was fabricated as outlined in Example 1 except that the electrolyte was 1.0M LiClO$_4$ in 1,3 propane sultone. This battery was operated as in Example 1, with the initial cycle between 0.6 and 2.5 V. Subsequent cycles were between 0.8 and 2.5 V. The sixth cycle with a 6.5% reduction level of the polymer, had a coulombic efficiency of 99%.

EXAMPLE 5

A battery was fabricated as outlined in Example 1 except that both the anode and cathode were polyacetylene with a lithium reference electrode and LiClO$_4$ in propane sultone as the electrolyte. The anode and cathode were initially charged and discharged vs. the lithium reference and then cycled vs. the other between 1.4 and 3 V. The coulombic efficiency on the sixth cycle with a 3% reduction and oxidation level, was 88%.

EXAMPLE 6

A cell was assembled in an orgon-filled dry box with a lithium anode pressed against a polished nickel plated anvil and a cathode consisting of 24.3 mg of poly (p-phenylene) combined with an additional 2.4 mg of acetylene black (Shawinigan TM Black). The cathode material was pressed into the bottom of a cylindrical gold-plated stainless steel container. Anode and cathode were separated by a non-woven glass spacer which was saturated with the electrolyte (1MLiAsF$_6$ in 1,4-butane sultone). The anode and cathode were each ½ inch (1.1 cm) in diameter. The cell was cycled in the range 2.0 V to 0.25 V so that the polyphenylene would be reduced to a composition of the type, $[(C_6H_4)^{-y}Li^+_y]_x$. The cell was cycled twice, the second discharge being equivalent to a change in y; Wy=0.081, but with only a fraction of this capacity being recoverable on charge, Wy=0.026.

EXAMPLE 7

A 1.4 cm$^2$ sample of PA grown on carbon felt (CF) weighing 31 mg total (about 12 mg of PA) was attached at one end to a Pt wire, wrapped in glass filter paper and then Li foil counter electrode. A 4:1 mixture of propylene carbonate (PC) and propane sultone (PS) was made 1 molar in LiClO$_4$ and used as the electrolyte. The cell was cycled 3 times between 2.5 V and 0.6 V with capacities (and coulombic efficiencies) of 1.22 mAh (51%), 3.96 mAh (72%) and 3.96 mAh (95%). The capacities per gram of $[(CH)^{-y}Li^+_y]_x$ plus the CF support are 39 mAh/g, 128 mAh/g and 128 mAh/g respectively.

EXAMPLE 8

A cell was fabricated from 13 mg (1.6 cm$^2$) of polyacetylene (PA) wrapped in Pt gauze, 2.5 cm$^2$ of Li foil, a glass filter paper separator and an electrolyte in 1M LiClO$_4$ in propane sultone (PS). The cell was cycled 3 times to a PA reduction level of 6% and back to neutrality. Approximately half of the PS solution was removed and replaced by dry distilled propylene carbonate (PC). The next three cycles between voltage limits of 2.5 and 0.7 V had coulombic efficiencies of 57%, 87% and 95% with the recharge corresponding to PA doping levels of 3.6%, 11.4% and 12.1%.

COMPARATIVE EXAMPLE 9

A cell comprised of 7 mg of PA (1.4 cm$^2$) wrapped in Pt gauze, 3 cm$^2$ of Li foil counter-electrode, 0.5 mL of 1M LiClO$_4$ in dry propylene carbonate and a glass filter paper separator was cycled between the voltage of 0.4 V and 2.5 V. The capacities (and coulombic efficiencies) were 4.1% (55%), 1.2% (25%) and 0.87% (42%).

EXAMPLE 10

Two samples of PA grown on carbon felt and pressed at 1 ton/cm$^2$ (88 MPa) (each weighing 16 mg with about 8 mg PA) were cycled in separate cells containing Li counter electrodes. One was oxidized to 3.8 V vs Li in one molar LiClO$_4$ in propylene carbonate and then reduced to its neutral state. The other was reduced to 0.6 V vs Li and oxidized back to its neutral state in one molar LiClO$_4$ in propane sultone. Both electrodes were washed in a fresh 4:1 mixture of propylene carbonate to propane sultone and then assembled together in a cell with one molar LiClO$_4$ in propylene carbonate to propane sultone (4:1). The cell was cycled between 1.4 V and 3.2 V with capacities (and coulombic efficiencies) of a 0.94 mAh/cm$^2$ (96%), 1.01 mAh/cm$^2$ (80%), 1.21 mAh/cm$^2$ (76%), 1.08 mAh/cm$^2$ (75%) and 0.83 mAh/cm$^2$ (88%).

EXAMPLE 11

A 2 cm$^2$ piece of PA grown on Pt gauze (19.4 mg. of PA) was electrochemically Li$^+$ doped in a cell with one molar LiClO$_4$ in propane sultone using a Li foil counter electrode. The cell was cycled between 0.2 V and 2.5 V with the coulombs passed on recharge equal to 8.9 mAh (coulombic efficiencey of 63%) or 22% reduction level of PA. Then the following sequence of washes was used to remove sulfur-containing compounds not bound to the polyacetylene. The PA electrode was removed, washed with dry THF and placed in a new cell with one molar LiClO$_4$ (THF) as the electrolyte and cycled twice between 0.8 and 2.5 V. The electrolyte was then replaced by fresh LiClO$_4$ (THF) and cycled two more times. After a fourth change of electrolyte and two final cycles between 0.8 and 2.5 V, the PA electrode was rinsed in THF and dried in vacuo. Analysis of the electrode surface by ESCA indicated that it was composed of 8–18% $S^{+6}$, indicating that an insoluble sulfur-containing coating had been formed during the initial cycle in propane sultone.

We claim:

1. A polymeric electrode comprising a conjugated backbone polymer as electroactive material and a surface coating which is the product of reaction between a reduced conjugated backbone polymer and an organic compound selected from the group consisting of sultones of the formula

wherein R is alkylene of 2–12 carbons or alkoxy-substituted alkylene of 2–12 carbons or fused polycyclic of 9–20 carbons and other ring atoms, forming with sulfur and oxygen a heterocyclic ring of 4–7 atoms and sulfonates of the formula

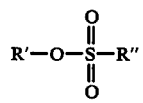

wherein R" is alkyl of 1–12 carbons, aryl, or alkyl-substituted aryl; and R' is unsubstituted alkyl of 1–12 carbons or is such alkyl substituted by alkoxy, aryl, alkylaryl, aromatic heterocycle, non-aromatic unsaturated heterocyclic or saturated heterocycle, or is $H((CH_2)_p-O)_q-(CH_2)_m$ where m is an integer of 1–3, p is an integer of 1–3 and q is an integer of 1–20, or is

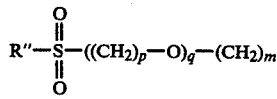

with m, p and q as defined above.

2. The polymeric electrode of claim 1 wherein said organic compound is a sultone.

3. The polymeric electrode of claim 2 wherein R is $(CH_2)_n$ with n being an integer of 3 to 5.

4. The polymeric electrode of claim 3 wherein n is 3.

5. The polymeric electrode of claim 3 wherein n is 4.

6. The polymeric electrode of claim 3 wherein said conjugated backbone polymer is polyacetylene.

7. The polymeric electrode of claim 1 wherein said conjugated backbone polymer is polyacetylene.

8. The polymeric electrode of claim 1 wherein said conjugated backbone polymer is poly(p-phenylene).

9. A battery comprising at least two electrodes, at least one of which is the electrode of claim 1.

10. The battery of claim 9 wherein said polymeric battery electrode is an anode into which alkali metal or tetraalkylammonium cations are inserted during the charging of said battery.

11. The battery of claim 10 wherein said organic compound is a sultone.

12. The battery of claim 11 wherein R is $(CH_2)_n$ with n being an integer of 3 to 5.

13. The battery of claim 12 wherein said conjugated backbone polymer is polyacetylene.

14. The battery of claim 10 wherein said conjugated backbone polymer is polyacetylene.

15. The battery of claim 10 wherein said anode is inserted by lithium cations during charging.

16. The battery of claim 10 wherein said anode is inserted by sodium cations during charging.

17. The battery in claim 12 wherein said anode is inserted by sodium cations during charging.

* * * * *